United States Patent [19]
McNally

[11] 3,804,026
[45] Apr. 16, 1974

[54] TROUGH HATCH LOCKING DEVICE

[75] Inventor: George S. McNally, South Holland, Ill.

[73] Assignee: Pullman Incorporated, Chicago, Ill.

[22] Filed: Aug. 10, 1972

[21] Appl. No.: 279,588

[52] U.S. Cl.................. 105/377, 292/210, 292/246
[51] Int. Cl............................................ B61d 39/00
[58] Field of Search .............. 105/377; 220/55, 57; 292/256, 246, 210, 108, 304

[56] References Cited
UNITED STATES PATENTS

| | | | |
|---|---|---|---|
| 3,664,270 | 5/1972 | Stark et al. | 105/377 |
| 2,468,259 | 4/1949 | Foster | 292/246 |
| 3,523,506 | 8/1970 | Williams | 105/377 |
| 3,605,639 | 9/1971 | Infram | 105/377 |
| 3,522,774 | 8/1970 | Beezhold | 105/377 |

*Primary Examiner*—Gerald M. Forlenza
*Assistant Examiner*—Richard A. Bertsch
*Attorney, Agent, or Firm*—Hilmond O. Vogel

[57] ABSTRACT

A trough hatch cover locking strap is positioned to overlap the adjacent end portions of two trough hatch covers and the strap includes a free end which is locked in the latched position by a locking bar having a pivoting locking shackle engageable with a roof mounted locking hook thereby maintaining the locking bar in the locked down position.

4 Claims, 4 Drawing Figures

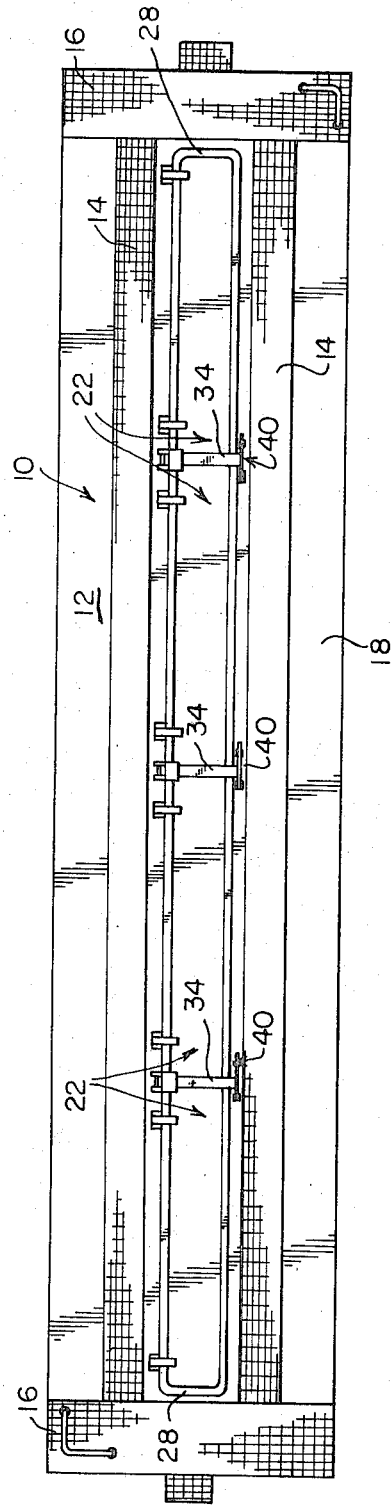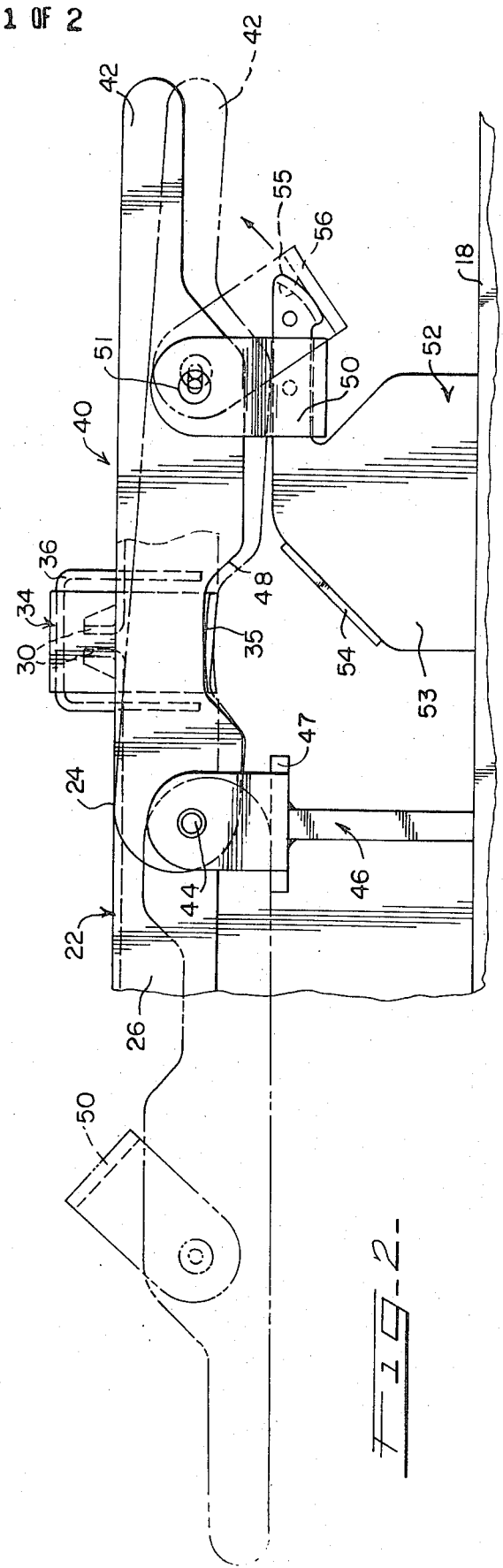

TROUGH HATCH LOCKING DEVICE

BACKGROUND OF THE INVENTION

1. Field of the Invention

This invention relates to railway hopper cars and in particular to those cars having a longitudinally extending trough hatch opening which is closed off by a suitable hatch cover. The present invention pertains to a novel method of rapidly and easily locking the trough hatch covers in the sealed position.

2. Description of the Prior Art

Prior art disclosed in Schilf and Letanosky U. S. Pat. No. 3,552,324 disclosed a locking strap secured in place by a pivoted locking handle and a roof mounted spring biased locking pin unit. The Cisco U. S. Pat. No. 2,873,696 discloses a locking hinge strap held in place by a pivoted L-shaped locking bar which is also locked in position by a roof mounted locking pin member.

The present invention has eliminated the need for a locking pin and the associated close tolerance and alignment considerations which are always present with such a locking scheme.

SUMMARY

The present invention relates to a device for restraining the locking handled used to secure hopper hatch covers in the closed and sealed position. In the operation, a locking bar holds down the hinge strap and includes a pivotally attached shackle member which swings into a locking connection with a roof mounted receiving hook portion. The locking bar is pivotally positioned above the roof sheet surface and does not contact the roof sheet when in the unlocked position, thus eliminating any nicks or marring of the painted surface which could cause premature corrosion and discloration of the car roof sheet.

It is an object of the present invention to provide a trough hatch locking device wherein the locking bar member which engages the hatch restraining strap member includes a depending rotatable shackle which is engageable with a roof mounted mating portion for easily locking and unlocking the trough hatch covers.

These and other objects of the invention will become apparent from reference to the following description, attached drawings and appended claims.

BRIEF DESCRIPTION OF THE DRAWINGS

FIG. 1 is a top plan view of a railway hopper car employing the hatch lock of the present invention;

FIG. 2 is a side elevational view of the locking device of the present invention;

DESCRIPTION OF THE PREFERRED EMBODIMENT

Figure 3:
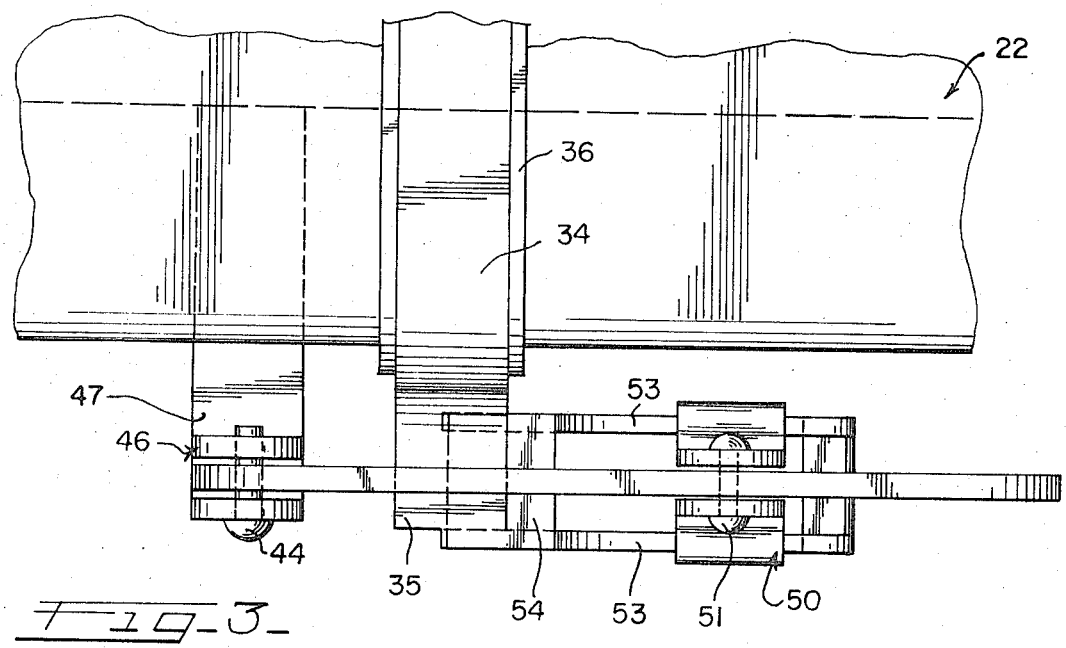
FIG. 3 is a top view of the locking device illustrated in FIG. 2.

The drawings illustrate a trough hatch hopper car designated by the numeral 10 and include the usual roof structure 12 having a pair of longitudinally extending walkways 14 joining the transversely extending end walkways 16 which provide a convenient platform for operators who may desire to open and close the hatches. The roof structure 12 may include a sheet portion 18 which extends generally outwardly and downwardly from a generally vertically extending coaming portion 20 which forms a side of the hatch opening. The coaming 20 includes a rounded top portion which provides additional stiffening to the roof structure and also provides a convenient sealing surface. The hatch covers are designated by the numeral 22 and are pivotally mounted on the roof structure 12 to move easily into a closed position to seal off the trough hatch and prevent the entrance of moisture or other contaminants into the car interior. As illustrated most conveniently in FIG. 4, the hatch covers 22 include a generally flat top portion 24 extending between the downwardly extending sides 26 which form the longitudinally extending edges of the hatch covers. The end hatch covers include transversely and downwardly extending end portions 28 which insure a complete seal of the hatch opening. Spaced from the end flange portions are the upturned intermediate end portions 30 which are spaced adjacent one another to thereby be conveniently sealed. A sealing gasket 32 is secured to the underside of the hatch cover 22 and extends around the outer periphery of the hatch cover to form a water and air tight seal with the upper round portion of the coaming 20.

A plurality of hinged locking straps 34 are positioned for pivotal movement in the area adjacent the upturned end portions 30 of the hatch covers 22. The hinged strap unit 34 includes a locking extension portion 34 and is best illustrated in FIGS. 2 and 3. A generally U-shaped gasket restrainer and receiving member 36 forms a portion of the locking strap assembly and is designed to fit over the contour of the hatch cover 22. A gasket 38 is positioned within the retainer 36 and held in place by a suitable adhesive or mechanical fastener and engages the upturned end flanges 34 to form a watertight seal connecting the hatch cover end portions. It is also understood that the hinge straps 34 may also be positioned adjacent the ends 28 to hold down and seal the ends of the hatch covers 22.

The locking bar unit of the present invention is designated generally by the numeral 40 and is positioned adjacent each transversely extending locking strap 34. The locking bar unit includes a locking bar member 42 which extends generally longitudinally of the vehicle and includes a pivotal connection 44 spaced above the roof sheet 18 by a mounting lug assembly 46. The locking bar 42 includes a notched portion 48 which receives the locking extension 35 of the locking strap 34 and has inclined leadin portions to guide the extension 35 into seated position on the locking bar 42. A locking shackle 50 is pivotally attached at 51 to the locking bar 42 and is loosely fitted to provide for easy rotational movement of the locking bar.

Figure 4:
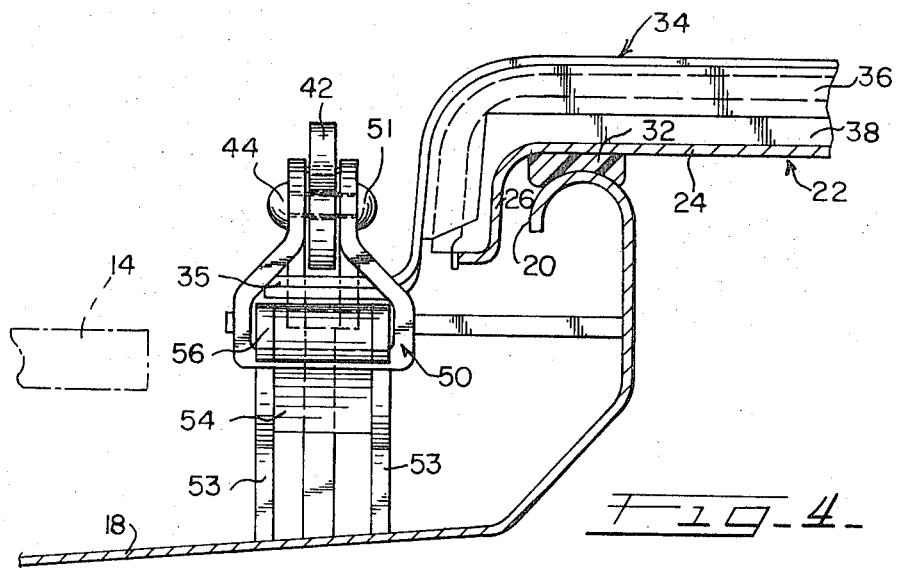
FIG. 4 is an end view of the locking device with portions of the roof and hatch cover shown in section.

The associated part of the locking device which cooperates with the shackle 50 is the locking hook assembly 52 which is fixedly attached to the roof sheet 18 of the hopper car. As shown in FIGS. 2 and 4 this hook assembly includes a pair of spaced hook members 53 which are interconnected by a reinforcing plate 54 to provide a rigid and strong structure to securely hold the locking bar 42 in the locked position. Each hook member 53 includes a nose portion 55 which has a rounded profile and is interconnected by a nose plate 56 which extends between the spaced hook members 53 to thereby provide a reinforced nose portion. As noticed in FIG. 2, nose portion 55 is so positioned as to permit clearance of the shackle 50 which passes under the nose portion 55 and is received by the cutout locking hook assembly.

In the operation of the trough hatch locking device it is noticed with reference to FIG. 2 that in the unlocked position the locking bar 42 will rest on the top plate 47 of the mounting lug assembly 46 and thereby be spaced above the roof sheet 18. This spacing from the roof sheet in the unlocked position is an important feature because of the undesirability of having the locking bar contact the roof surface which often results in chipping of the paint from the roof which can result in premature corrosion and discoloration of the roof sheet and car sides.

To lock the trough hatch covers the handle 42 is rotated from the unlocked position which is shown in phantom in FIG. 2 in a clockwise direction whereby the locking notch portion of the handle 42 will contact the hinge strap locking extension 35 and thereafter as the locking handle moves in a generally downward direction the gaskets 32 which form a seal between the trough hatch cover 42 and the associated hatch coaming 20 will be compressed to seal off the interior of the hopper car. Also upon initiation of contact between the locking bar 42 and the extension portion 35, the gaskets 38 which are contained within the locking strap 34 will likewise compress about the end flanges of the adjacent ends of the trough hatch covers and form a seal transversely across the hatch covers. Another resilient or biasing condition which exists is a slight bending which occurs on the strap extension 35 which acts as a short cantilever and provides a spring biasing force after contact is initiated between the locking bar 42 and this extension portion 35. As the gaskets are compressed and the locking strap 34 is forced downward on the trough hatch covers the handle will move into a position illustrated in the right hand portion of FIG. 2 and shown in phantom whereby contact occurs between the bottom of the locking handle 42 and the top of the locking hook assembly 52. At this point the shackle 50 is in a position to be freely rotated downwardly and to receive the nose portion 55 of the locking hook assembly 52. The design is intended to provide for a free automatic movement of the shackle by the force of gravity and thereby relieve the operator of any manual movement in performing the locking operation.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A hopper hatch structure with a roof provided with a hatch opening surrounded by an upstanding coaming, and pivoted hatch cover means mounted on said roof and rotatable to engage said coaming to close the hatch opening, the improvement comprising:

a pivoted hinge strap supported adjacent said hatch cover means, and said hinge strap having a locking portion extension protruding outwardly of said coaming when said hinge is in the hatch contacting position;

a locking bar positioned for rotational movement in a plane transverse to the rotation of the hinge strap and having a locked and unlocked position;

said locking bar having a portion engageable with the hinge strap extension when the locking bar is in the locked position;

a swinging shackle member pivotably attached to said locking handle;

a roof mounted locking hook assembly positioned in line with the shackle member to thereby receive the shackle member, and said locking bar including a locking notch portion engageable with the extension portion of the hinge means for confined locking of same;

said notch portion also including inclined guide surfaces for urging the hinge extension portion into said notch.

2. The invention according to claim 1, and: said locking bar pivotably mounted above said roof on a mounting platform having a top plate portion engageable with the locking bar in the unlocked position to thereby space the locking bar above the roof of said hopper structure.

3. The invention according to claim 1, and: said locking hook assembly including a pair of spaced hook members interconnected by rigidifying bar portions and having a rounded nose portion to thereby provide for gradual engagement of the locking shackle with the locking hook assembly.

4. A railway hopper car having a roof structure with a continuous longitudinally positioned trough hatch covered by hinged hatch covers having adjacent intermediate end portions and having side and end portions extending downwardly parallel with said coaming, and the improvement comprising:

a locking and sealing hinge strap positioned for independent transverse rotational hinged movement in a plane overlying the adjacent intermediate end portions of the hatch covers and said hinge strap also having an extension portion;

a locking bar positioned adjacent the trough hatch and spaced above said roof by a mounting stand to thereby permit the locking bar to swing transversely to the rotation of the locking strap;

a locking hook assembly fixedly attached to said roof structure and aligned with the rotational plane of said locking bar;

a locking shackle pivotally attached to said locking bar and positioned for locking engagement with said roof mounted hook assembly, and said locking bar including a notch portion having sloped lead in surfaces for guiding locking engagement between the locking bar and the hinge strap extension portion.

* * * * *